Nov. 19, 1935.  W. OWEN  2,021,197
METHOD OF AND APPARATUS FOR BENDING GLASS SHEETS
Filed March 9, 1934  3 Sheets-Sheet 3

INVENTOR
WILLIAM OWEN.
BY Bradley & Bee
ATTORNEYS

Patented Nov. 19, 1935

2,021,197

UNITED STATES PATENT OFFICE 2,021,197

METHOD OF AND APPARATUS FOR BENDING GLASS SHEETS

William Owen, Pittsburgh, Pa., assignor to Pittsburgh Plate Glass Company, a corporation of Pennsylvania Application March 9, 1934, Serial No. 714,779

4 Claims. (Cl. 49—67)

Figure 1:
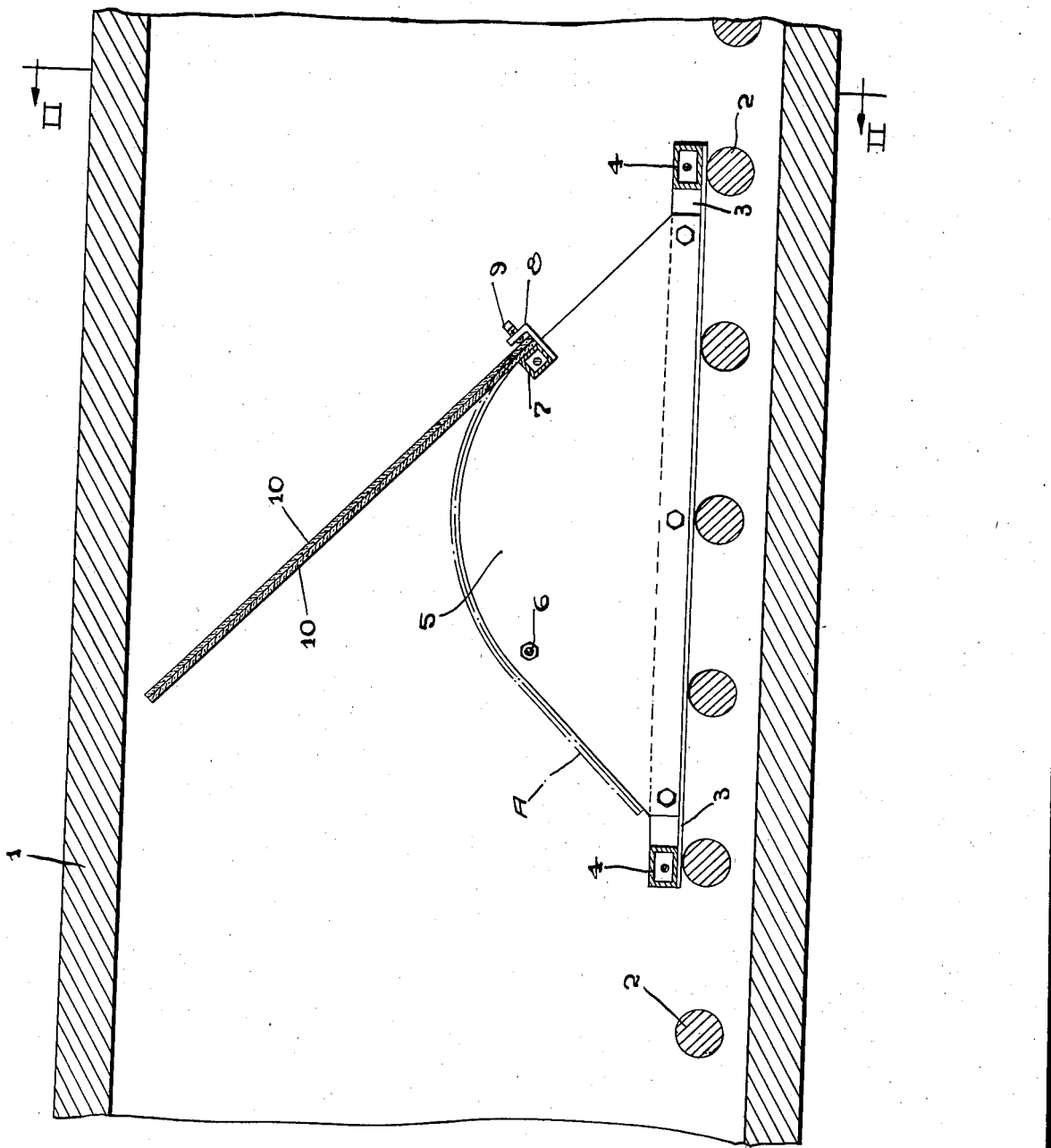
Figure 2:
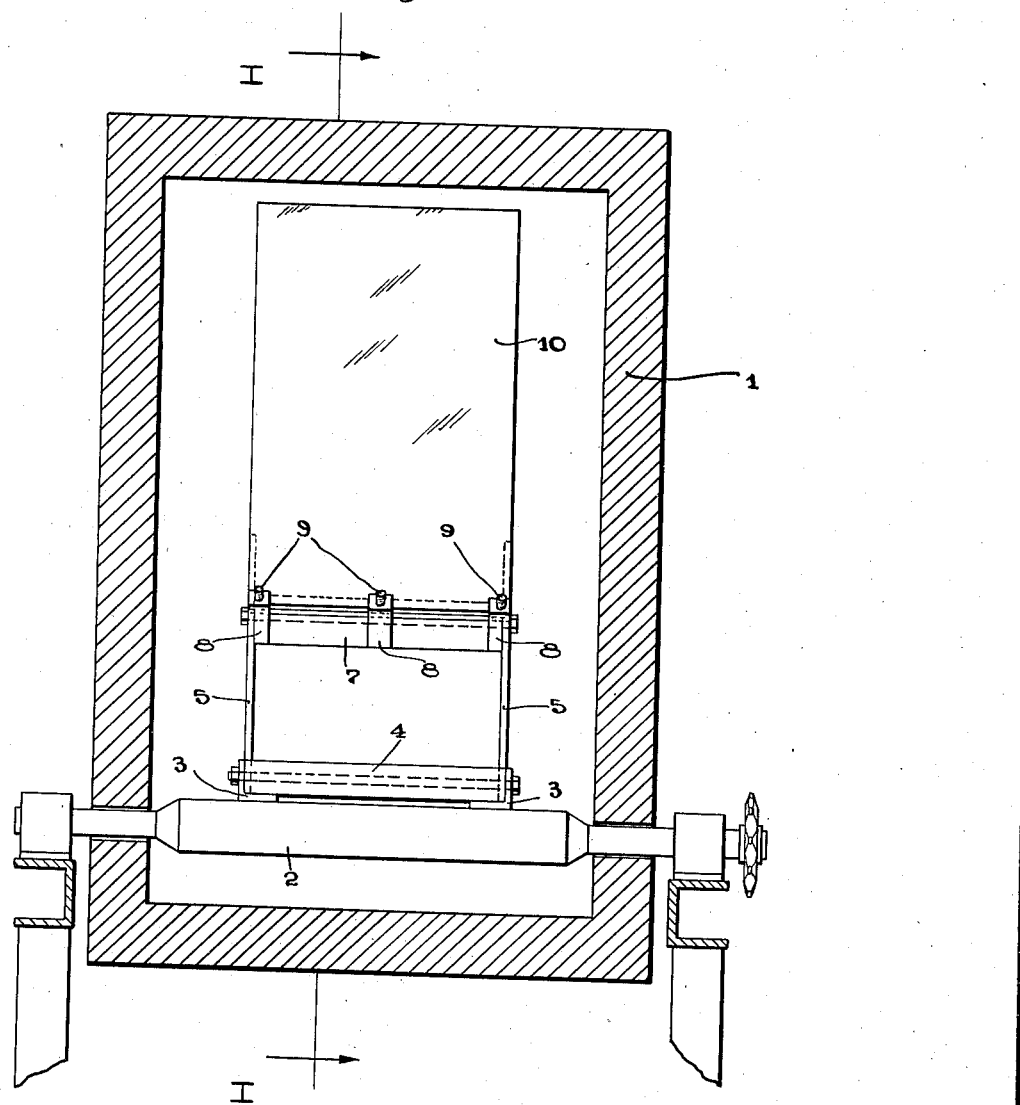
Figure 3:
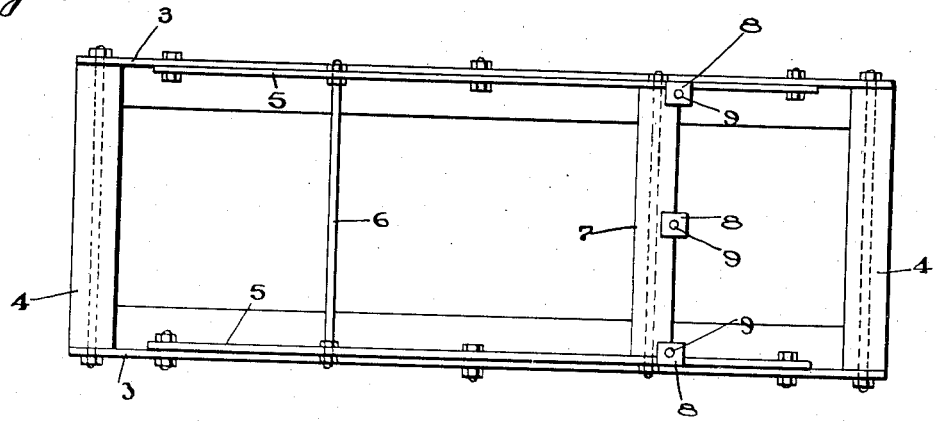
Figure 4:
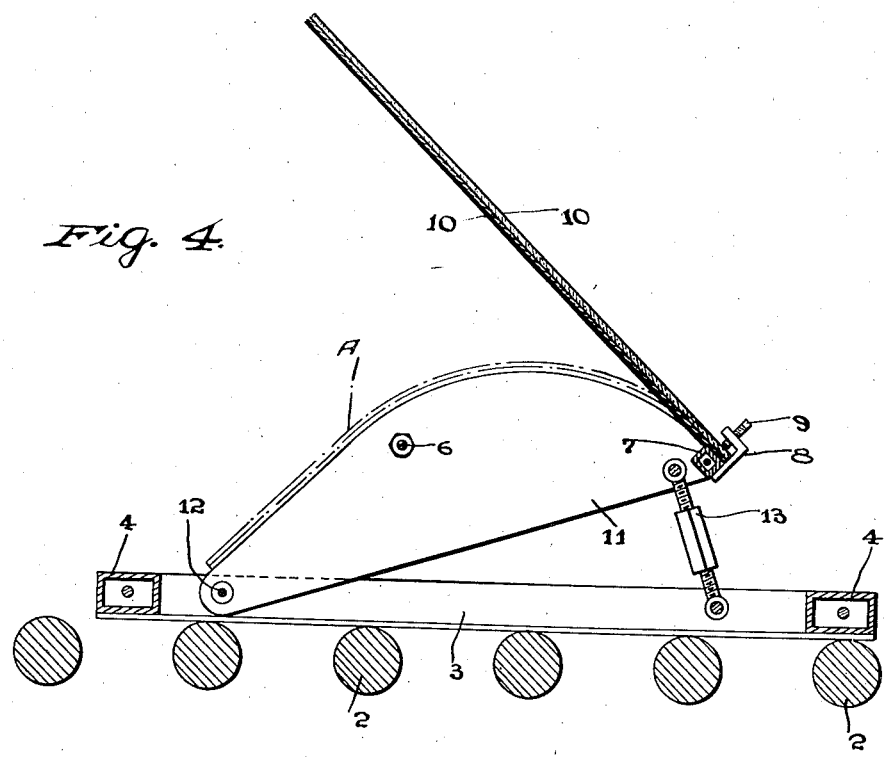

The invention relates to apparatus for bending glass sheets or plates. The principal use of the invention is in bending glass sheets in pairs for making safety glass, and it is so illustrated, but it will be understood that the apparatus is equally applicable in the bending of single sheets. The form is designed to be used in connection with a tunnel kiln or leer through which the forms carrying the sheets are moved and exposed to a temperature such that the glass sheets bend by gravity until they fit the mold or form, but the bending may occur in a kiln or oven in which the form is maintained stationary during the heating and bending operation. The principal object of the invention is the provision of a form which will support the glass, so that the weight of the glass imposes a maximum bending moment thereon, resulting in a bending of the sheet at a minimum temperature, thus reducing the tendency of the glass to be marred on the surface contacting with the form. A further object is the provision of a form particularly adapted to bend sheets which have one portion which is flat or nearly so, and another portion which is quite sharply bent. One embodiment of the invention is illustrated in the accompanying drawings, wherein:

Figure 1 is a longitudinal section through a tunnel kiln on the line I—I of Fig. 2 carrying the improved form. Fig. 2 is a section on the line II—II of Fig. 1. Fig. 3 is a plan view of the form. And Fig. 4 is a longitudinal section of a modified construction.

Referring to Figs. 1, 2 and 3, I is a tunnel kiln or oven provided with the rollers 2 which are driven, so that the forms carrying the glass sheets to be bent are moved slowly through the kiln. The temperature in the entrance end of the kiln preferably ranges about 1000 deg. F. in order to supply the temperature necessary to cause the glass sheets to bend by gravity, after which the temperature in the leer decreases gradually to a point at which the bent glass may be removed and handled without inconvenience.

The frame of the form or mold comprises a pair of angles 3, 3 secured together at their ends by the cross ties 4, 4. On this frame is mounted a pair of plates 5, 5 having their upper edges cut to the contour to which the glass sheets are to be bent. These sheets are secured together by the cross ties 6 and 7, the latter being hollow and square in cross section, as indicated in Fig. 1. The cross tie 7 is provided with three clips 8, 8, 8 carrying the screws 9. The two glass sheets 10 which are to be bent are secured at one end against the cross tie 7 by means of the screws 9, which thus form a clamping device, and when the operation is started, the sheets lie at a tangent to the curved plates at an acute angle to the horizontal, as indicated in Fig. 1. When sufficient heat is applied in the oven, the glass sheets soften and bend down to fit the plates 5, 5, as indicated in the dotted lines A of Fig. 1.

With this construction, the bending moment upon the glass is much greater than if the glass sheets were supported at their two ends and allowed to sag under the action of the heat, as has heretofore been the practice. As a result, the glass will bend at a lower temperature than would otherwise be the case, and any tendency for the sheets to be marred where they contact with the plates 5, 5 is correspondingly reduced. The construction is particularly advantageous in those cases in which a portion of the glass sheets have a relatively sharp bend at one end and a relatively flat portion at the other end, this construction being shown in Fig. 1, wherein the right hand end of the sheets are given a sharp bend and the left hand ends thereof are relatively flat. The bending moment applied to the glass sheets is greatest at the right hand end where the sheets have to make their sharpest bend, and at the other end where the sheets are relatively flat, the bending temperature is so low that there is no tendency of the sheet to sag between the plates 5, 5 as would otherwise be the case in bending a sheet having a relatively flat portion with little or no arch in the glass to stiffen it against bending intermediate its side edges.

Fig. 4 illustrates a modification in which the side plates 11, 11 of the form are mounted for pivotal adjustment about the cross tie 12, such adjustment being accomplished by means of a pair of turnbuckles 13. This permits of an adjustment of the angle of the plates 11, 11 with respect to the horizontal so that the temperature at which the glass sheets are caused to bend may be modified depending upon conditions. If it is desired that the sheets shall bend at a lower temperature, the side plates 11, 11 are swung upward so that the angle of the glass sheets 10, 10 with respect to the horizontal becomes more acute, it being apparent that the bending moment is increased as the plane of the glass sheets 10, 10 approaches the horizontal. In other respects, this construction is similar to that of Figs. 1 to 3 and the parts bear similar numerals.

What I claim is:

1. A form for bending a glass sheet having the contour to which the sheet is to be bent, clamping means at one end of the form for securing the end of the sheet to the form so that the sheet at said end lies at a tangent to the curve of the form and at an acute angle to the horizontal, and means for adjusting the end of the form to which the sheet is secured up and down to vary the angle of the sheet with respect to the horizontal.

2. A method of bending glass which comprises supporting a sheet of glass at one end only with the sheet lying at an angle to the vertical and applying heat thereto whereby the sheet is caused to bend under the influence of gravity.

3. A method of bending glass which comprises supporting a sheet of glass at one end only with the sheet lying at an angle to the vertical, applying heat thereto and controlling the degree to which the sheet may bend under the force of gravity.

4. A method of bending glass which comprises supporting a sheet of glass at one end only with the sheet lying at an angle to the vertical, applying heat thereto and causing the sheet to assume a predetermined curvature under the influence of gravity.

WILLIAM OWEN.